United States Patent Office 3,280,166
Patented Oct. 18, 1966

3,280,166
PROCESS FOR THE OXIDATION OF OLEFIN-AMMONIA MIXTURES TO UNSATURATED NITRILES
James L. Callahan, Bedford, and Joseph J. Szabo, Chagrin Falls, Ohio, and Berthold Gertisser, New York, N.Y., assignors to The Standard Oil Company, Cleveland, Ohio, a corporation of Ohio
No Drawing. Original application May 28, 1962, Ser. No. 197,932, now Patent No. 3,186,955, dated June 1, 1965. Divided and this application Aug. 19, 1964, Ser. No. 395,978
7 Claims. (Cl. 260—465.3)

This application is a division of copending application Serial No. 197,932, filed May 28, 1962, now U.S. Patent 3,186,955.

This invention relates to the oxidation of olefin-ammonia mixtures to unsaturated nitriles, such as propylene-ammonia to acrylonitrile, using an improved oxidation catalyst consisting essentially of oxides of the elements bismuth and molybdenum, and optionally, phosphorus, promoted by oxides of barium and silicon.

The Callahan, Foreman and Veatch U.S. Patent No. 2,941,007 describes the oxidation of an olefin such as propylene and the various butenes with oxygen and a solid cataylst composed of the oxides of bismuth, molybdenum and silicon, and optionally, phosphorus. This cataylst selectively converts propylene to acrolein, isobutylene to methacrolein, α- and β-butylene to methyl vinyl ketone and to butadiene, etc. High yields are obtainable, although in the case of the butenes, careful control of reaction conditions may be required in order to direct the reaction in favor of either methyl vinyl ketone or butadiene, depending upon which of these alternative products is desired.

The Idol Patent No. 2,904,580, employs the same catalyst to convert propylene, ammonia and oxygen to acrylonitrile, at approximately atmospheric pressures and elevated temperatures. Excellent conversions, usually in the range of 40 to 80%, nitrogen basis, of useful products are obtainable.

THE CATALYST

In accordance with the instant invention, the catalytic activity of such bismuth oxide-molybdenum oxide catalysts is greatly enhanced or promoted by the combination therewith of a mixture of barium and silicon in the form of their oxides, referred to hereinafter as promoters. The promoters in accordance with the invention are best applied by impregnation or surface coating of the catalyst, after its formation in accordance with the procedure described in Serial No. 851,919, now U.S. Patent 3,044,966, the disclosure of which is hereby incorporated by reference. Further, in accordance with the invention, it has been determined that phosphorus oxide can also be present as a supplemental oxide.

The proportions of barium oxide and silicon oxide, with or without phosphorus oxide and/or manganese oxide, are important in obtaining the optimum enhanced activity. The barium oxide concentration, caluculated as barium, should be within the range from about 1 to about 5% by weight; and the amount of silicon oxide, calculated as silicon, should be within the range from about 1 to about 10% by weight, although more than 10% can be used, if desired.

While the catalyst of this invention may be employed without any support, it is desirable to combine it with a support. A preferred support is silica because the silica improves the catalytic activity of the catalyst. The silica may be present in any amount but it is preferred that the catalyst contain between about 25 to 75% by weight of silica. Many other materials such as Alundum, silicon carbide, alumina-silica, alumina, titania and other chemically inert materials may be employed as a support which will withstand the conditions of the process.

The catalyst may comprise phosphorus, also present in the form of the oxide. Phosphorus will affect, to some extent, the catalytic properties of the composition, but the presence or absence of phosphorus has no appreciable effect on the physical properties of the catalyst. Thus, the composition can include from 0%, and preferably from at least 0.1%, up to about 5% by weight of phosphorus oxide, calculated as phosphorus.

The promoter is incorporated with the catalyst base by impregnation thereof, using an aqueous solution, dispersion, or suspension of a barium compound and of a silicon compound, either the oxide, or a compound thermally decomposable in situ to the corresponding barium oxide or silicon oxide, respectively, without formation of other deleterious metal oxide residue, for instance, barium acetate, fluosilicic acid, barium bromide, barium chloride, barium nitrate, barium peroxide, barium persulfate, barium propionate, ammonium silicofluoride, sodium silicate, potassium silicate, hydrous barium silicate, silicic acids, such as monosilicic acid and polysilicic acids of low molecular weight, hydrous silica and colloidal silica. After impregnation with such solution, employed in a concentration and amount to provide the desired amount of barium and silicon, the catalyst base is dried, and then calcined at a temperature above that at which the compounds applied are decomposed to the oxides. Temperatures in excess of 800° F. but below that at which the catalyst is deleteriously affected, usually not in excess of about 1050° F., can be used.

The basic catalyst composition comprises bismuth oxide and molybdenum oxide, the bismuth-to-molybdenum ratio Bi:Mo being controlled so that it is at all times above 1:3. There is no critical upper limit on the amount of bismuth, but in view of the relatively high cost of bismuth and the lack of an improved catalytic effect when large amounts are used, generally the atomic ratio bismuth to molybdenum Bi:Mo of about 3:1 is not exceeded. The nature of the chemical compounds which compose the basic catalyst is not known. The catalyst may be a mere mixture of bismuth and molybdenum oxides, with or without phosphorus oxide, but it seems more likely that the catalyst is a homogeneous micro mixture of loose chemical combinations of oxides of bismuth and molybdenum, with, optionally, phosphorus, and it is these combinations which appear to impart the desirable catalytic properties to this catalytic composition. The catalyst can be referred to as bismuth molybdate, or, when phosphorus is present, as bismuth phosphomolybdate, but this term is not to be construed as meaning that the catalyst is composed of these compounds.

The barium and silicon compounds added thereto as promoters may or may not enter into the chemical composition of the catalyst. Silicon added later with barium produces a different result from silicon added to a catalyst composition as a support and has a different function, since the enhanced catalytic effect is not obtained when silicon oxide is combined as a support. Hence, the promoted catalytic effect may be due to some complex silicon oxide-barium oxide combination formed on the surface of the catalyst. In any event, the silicon and barium are present in the form of their oxides, when combined therewith later in accordance with the invention.

The bismuth molybdate catalyst composition of the invention may have the following composition ranges, as long as the atomic ratio of bismuth to molybdenum is above 1:3.

| Element: | Weight percent |
|---|---|
| Bismuth | 29.84–78.08 |
| Molybdenum | 11.32–47.29 |
| Oxygen | 9.96–26.84 |
| Phosphorus | 0–2.40 |

This same composition may be expressed in the form of the following empirical formula:

(1) $Bi_aP_bMo_{12}O_c$ where $a$ is 4 to 36, $b$ is 0 to 2, and $c$ is $$\tfrac{1}{2}n \cdot a + \tfrac{1}{2}m \cdot b + \tfrac{1}{2}p \cdot 12$$

and where $n$, $m$ and $p$ are the average valences of bismuth, phosphorous, and molybdenum, respectively, in the oxidation states in which they exist in the catalyst as defined by the empirical formula above. Thus $n$ may range from 2 to 3, $m$ is about 5, and $p$ may range from 4 to 6, which collectively make $c$ range from 28 to 94.

When silica is used as the support, the empirical formula is (2) $Bi_aP_bMo_{12}O_c \cdot (SiO_2)_{1 \text{ to } 600}$ where $a$, $b$ and $c$ are as defined above.

When the silica is present as about 30 to 70 weight percent of the final composition, the empirical formula is (3) $Bi_aP_bMo_{12}O_c \cdot (SiO_2)_{30 \text{ to } 150}$ where $a$, $b$ and $c$ are as defined above.

To this are to be added barium oxide and silicon oxides, as such or as formed in situ from other added barium an silicon compounds, so that the empirical formula of the promoted catalyst in accordance with the invention corresponds to the following:

(4) $72.5–97\% (Bi_aP_bMo_{12}O_c \cdot (SiO_2)_{0-600})$
$\cdot 1–6\% BaO \cdot 2–21.5\% SiO_2$ The values of $a$, $b$ and $c$ are in accordance with the definitions given above.

When the atomic ratio of bismuth to molybdenum Bi:Mo is about 3:4, the empirical formula is (5) $72.5–97\% (Bi_9P_bMo_{12}O_c \cdot (SiO_2)_{0-600})$
$\cdot 1–6\% BaO \cdot 2–21.5\% SiO_2$ The values of $b$ and $c$ are as defined above.

When the silica is present as about 30 to 70 weight percent of the final composition, the empirical formula is (6) $72.5–97\% (Bi_aP_bMo_{12}O_c \cdot (SiO_2)_{30-150})$
$\cdot 1–6\% BaO \cdot 2–21.5\% SiO_2$ where $a$, $b$ and $c$ are as defined above.

OXIDATION OF OLEFINS TO NITRILES— THE REACTANTS

The reactants used are an olefin or mixture thereof and oxygen, plus ammonia. By the term "olefin" as used herein is meant the open-chain monoolefins. Among the many olefinic compounds which may be utilized in accordance with the process of the invention, the following compounds are illustrative: propylene, butene-1, butene-2, isobutylene, pentene-1, pentene-2, 3-methyl-butene-1, 2-methyl-butene-2, hexene-1, hexene-2, 4 - methyl - pentene-1, 3,3-dimethyl-butene-1, 4-methyl-pentene-2, octene-1, etc. This invention is directed particularly to the oxidation of the lower alkenes (3 to 8 carbon atoms) but higher alkenes may also be utilized with efficacy. The process of the invention is applicable to individual olefins as well as to mixtures of olefins and also to mixtures of olefins with the corresponding or other saturated organic compounds.

In its preferred aspect, the process comprises contacting a mixture comprising propylene, ammonia and oxygen with the catalyst at an elevated temperature and at atmospheric or near atmospheric pressure.

Any source of oxygen may be employed in this process. For economic reasons, however, it is preferred that air be employed as the source of oxygen. From a purely technical viewpoint, relatively pure molecular oxygen will give equivalent results. The molar ratio of oxygen to the olefin in the feed to the reaction vessel should be in the range of 0.5:1 to 3:1 and a ratio of about 1:1 to 2:1 is preferred.

The presence of the corresponding saturated hydrocarbons does not appear to influence the reaction to any appreciable degree, and these materials appear to act only as diluents. Consequently, the presence of the corresponding saturated hydrocarbons or other saturated hydrocarbons in the feed to the reaction is contemplated within the scope of this invention. Likewise, other diluents such as nitrogen and the oxides of carbon may be present in the reaction mixture without deleterious effect.

AMMONIA-OLEFIN RATIO

The molar ratio of ammonia to olefin in the feed to the reaction may vary between about 0.05:1 to 5:1. There is no real upper limit for the ammonia-olefin ratio, but there is generally no point in exceeding the 5:1 ratio. At ammonia-olefin ratios appreciably less than the stoichiometric ratio of 1:1, various amounts of oxygenated derivatives of the olefin will be formed.

Significant amounts of unsaturated aldehyde or ketone as well as nitrile will be obtained at ammonia-olefin ratios substantially below 1:1, i.e., in the range of 0.15:1 to 0.75:1. Outside the upper limit of this range only insignificant amounts of aldehyde or ketone will be produced, and only very small amounts of nitrile will be produced at ammonia-olefin ratios below the lower limit of this range. It is fortuitous that within the ammonia-olefin range stated, maximum utilization of ammonia is obtained and this is highly desirable. It is generally possible to recycle the olefin to the process, whereas the unconverted ammonia may be recovered and recycled only with difficulty.

H₂O-OLEFIN RATIO

A particularly surprising aspect of this invention is the effect of water on the course of the reaction. We have found that the presence of water in the mixture fed to the reaction vessel improves the selectivity and yield of the reaction as far as the production of the nitrile is concerned. Improvements on the order of several hundred percent have been observed in the presence of water as compared to similar runs made in the absence of added water. Consequently, the presence of water has a marked beneficial effect on this reaction, but reactions not including water in the feed are not to be excluded from this invention.

In general, the molar ratio of water to olefin should be at least about 0.25:1. Ratios on the order of 1:1 are particularly desirable but higher ratios may be employed, i.e., up to about 10:1. Because of the recovery problems involved, it is generally preferred to use only so much water as is necessary to obtain the desired improvement in yield. It is to be understood that water does not behave as an inert diluent in the reaction mixture. This conclusion has been verified by employing other diluents in the reaction mixture, such as propane and nitrogen. No corresponding improvement in yield and selectivity is observed with such diluents. Although the exact manner in which the water affects the reaction is not understood, it is clear that the water does have a significant influence on the reaction.

One theory which has been postulated to explain the effect of water on the reaction involves the phenomena occurring at the surface of the catalyst. Water, because of its polarity, may assist in the desorption of the reaction products from the surface of the catalyst. According to another hypothesis, the water may change the nature of the catalyst at the catalyst surface by affecting the acidity of the catalyst. Notwithstanding the fact that either of these theories may be in error, the improved results occasioned by the use of water are evident and the theory by which these results are to be explained is therefore to be considered immaterial.

PROCESS CONDITIONS

The temperature at which the reaction is carried out may be any temperature in the range of from about 550 to about 1000° F. The preferred temperature range runs from about 800 to 950° F.

The pressure at which the reaction is conducted is also an important variable, and the reaction should be carried out at about atmospheric or slightly above atmospheric (2 to 3 atmospheres) pressure. In general, high pressures, i.e., above 250 p.s.i.g., are not suitable for the process since higher pressures tend to favor the formation of undesirable by-products.

The apparent contact time employed in the process is not especially critical, and contact times in the range of from 0.1 to about 50 seconds may be employed. The optimum contact time will, of course, vary depending upon the olefin being treated, but in general it may be said that a contact time of from 1 to 15 seconds is preferred.

In general, any apparatus of the type suitable for carrying out oxidation reactions in the vapor phase may be employed in the execution of this process. The process may be conducted either continuously or intermittently. The catalyst bed may be a fixed bed employing a pelleted catalyst or, in the alternative, a so-called "fluidized" bed of catalyst may be employed. The fluidized bed offers definite advantages with regard to process control in that such a bed permits closer control of the temperature of the reaction as is well known to those skilled in the art.

The reactor may be brought to the reaction temperature before or after the introduction of the reaction feed mixture. However, on a large scale operation it is preferred to carry out the process in a continuous manner, and in such a system the recirculation of the unreacted olefin is contemplated. Periodic regeneration or reactivation of the catalyst is also contemplated, and this may be accomplished, for example, by contacting the catalyst with air at an elevated temperature.

The products of the reaction may be recovered by any of the methods known to those skilled in the art. One such method involves scrubbing the effluent gases from the reactor with cold water or an appropriate solvent to remove the products of the reaction. In such a case, the ultimate recovery of the products may be accomplished by conventional means. The efficiency of the scrubbing operation may be improved when water is employed as the scrubbing agent by adding a suitable wetting agent to the water. Where molecular oxygen is employed as the oxidizing agent in this process, the resulting product mixture remaining after the removal of the nitriles may be treated to remove carbon dioxide with the remainder of the mixture containing the unreacted propylene and oxygen being recycled through the reactor. In the case where air is employed as the oxidizing agent in lieu of molecular oxygen, the residual product after separation of the nitriles and other carbonyl products may be scrubbed with a nonpolar solvent, e.g., a hydrocarbon fraction, in order to recover unreacted propylene and in this case the remaining gases may be discarded. The addition of a suitable inhibitor to prevent polymerization of the unsaturated products during the recovery steps is also contemplated.

The following examples, in the opinion of the inventors, represent preferred embodiments of their invention:

Example I

A bismuth silicophosphomolybdate catalyst base was prepared by the following procedure:

74 g. of an 85% phosphoric acid was added to 8330 g. of an aqueous silica sol containing 30% silica. Next, 2800 g. of bismuth nitrate was dissolved in a solution made by diluting 160 ml. of 70% nitric acid to 1540 ml. with distilled water. The bismuth nitrate solution was then added to the silica sol. Next, 1360 g. of ammonium molybdate was dissolved in 1540 ml. of distilled water, and this solution added to the silica sol. The resulting catalyst slurry was dried in an oven at 200° F. for 24 hours and then calcined in a furnace at 800° F. for 24 hours. After cooling, the catalyst was ground into particles, and screened through a 10 mesh screen. A portion of the 8–10 mesh material was then made into tablets, while the remainder was retained for use as a control, designated hereinafter as Control A.

The final catalyst composition corresponded to the empirical formula $Bi_9PMo_{12}O_{52} \cdot (SiO_2)_{65}$, having the following composition.

| Element: | Weight Percent |
|---|---|
| Bismuth | 24.2 |
| Phosphorus | 0.4 |
| Molybdenum | 14.8 |
| Silicon | 23.4 |
| Oxygen | 37.2 |

This tabletted catalyst was then impregnated with promoters in accordance with the invention, by the following procedure:

25.9 g. of barium acetate was dissolved in hot water and diluted up to 420 ml. This hot solution was used to impregnate 400 g. of the tabletted catalyst prepared as described above, dipping tablets of the catalyst contained in a wire basket in the solution for 4 minutes, then removing and draining them for 4 minutes. By this procedure, 120 ml. of barium acetate solution was absorbed by the catalyst, equivalent to 4.4 g. BaO. The wet catalyst was dried overnight, and a portion was set aside, for use later as Control B.

The remainder of the barium acetate-impregnated catalyst was impregnated a second time by the above method using a solution prepared by diluting 206 g. of 30% fluosilicic acid solution to 420 cc. with water.

Another portion of the base catalyst (Control A), not previously impregnated with barium acetate solution, was then impregnated with the fluosilicic acid solution in the same way. This was marked Control C.

Both batches of the impregnated catalyst were dried at 120° C. overnight.

Controls B and C and the twice-impregnated catalyst of the invention then were calcined in air for 12 hours at 800° F. Finally, the three calcined catalysts were ground and screened, to obtain a size fraction in the 8 to 10 mesh range.

Thus, Control B contained 1% added barium, Control C 1% added silicon, Control A neither, and the catalyst of the invention, 1% added barium and 1% added silicon, together.

The promoted catalyst and the control catalysts A, B, and C without promoters and with only one promoter were employed in a series of experiments, to determine catalytic effectiveness, using a fixed bed reactor, in the oxidative conversion of propylene and ammonia to acrylonitrile. A 90 ml. catalyst charge was used in each run. Gases were metered by Rotameter, and water was fed by a Sigma motor pump. The feed ratios were held constant at $H_2C=CH-CH_3/NH_3/Air/N_2/H_2O$ 1/1.5/12/4/0.8, and the contact time was held constant at 5 seconds. The reaction temperature was varied from 850 to 910° F. in the series of runs carried out. The percent conversion to acrylonitrile versus reaction temperature for each catalyst was determined for the twice impregnated catalyst of the invention. At the optimum temperature range of 890 to 900° F. 94% of the propylene feed was converted, 77.6% being converted to acrylonitrile, 4.5% to acetonitrile, and the remainder to a mixture of carbon dioxide and hydrogen cyanide. The useful yield was 92.9%.

In contrast, Control A, the base catalyst without promoters, at the optimum temperature of 860–870° F., gave a total conversion of 93.2%, of which 63.4% was acrylonitrile, 13.0% acetonitrile and the remainder, carbon dioxide and hydrogen cyanide. The useful yield was 78.6%. The barium promoted Control B at the optimum temperature of 860–870° F. gave a total conversion of 70.8%, of which 51.4% was acrylonitrile, 8.4% acetonitrile and the remainder, carbon dioxide and hydrogen cyanide. The useful yield was 85.0%. The silicon promoted Control C at the optimum temperature of 900–910° F. gave a 78.6% total conversion, of which 58.4% was acrylonitrile, 6.2% acetonitrile, 1.9% acrolein, 2.4% acetaldehyde, and the remainder, carbon dioxide and hydrogen cyanide.

Thus, silicon alone and barium alone have a definite depressing effect on acrylonitrile formation, while the two together materially enhance the catalytic effect, as compared to the base catalyst.

*Example II*

The bismuth silicophosphomolybdate catalyst of Example I was employed to prepare another series of promoted catalysts corresponding to those of Example I but with a greater amount of barium. Control A, as before, was the base catalyst. Control B was prepared in the same way, but using a barium acetate solution containing 77.7 g. of barium acetate, three times the previous concentration, thus giving a catalyst containing 3% added barium, instead of 1%. Control C was identical to Example I, and the catalyst of the invention contained 3% added barium and 1% added silicon, as the oxides.

The catalysts were used in the conversion of propylene and ammonia to acrylonitrile, using the reactor of Example I.

The catalyst of the invention at the optimum temperature of 875° F. an air/$NH_3$/$H_2O$/$N_2$ ratio of 10/1/4/5, and a contact time of 8 seconds, gave a total conversion of 99.9% of which 75.4% was acrylonitrile, 4.5% acetonitrile, 0.9% acrolein, and the remainder carbon dioxide and hydrogen cyanide. The total useful yield was 79.9%. This is to be compared to the base catalyst, which under the Example I conditions gave a 63.4% conversion to acrylonitrile, 13.0% conversion to acetonitrile, and the remainder carbon dioxide and hydrogen cyanide, giving a total conversion of 93.2% and a useful conversion of 78.6%. Control B at 860–870° F. and the conditions of Example I gave a total conversion of 78.9%, of which 61.0% was acrylonitrile, 9.5% acetonitrile, and the remainder carbon dioxide and water, a total useful yield of 87.8%. Control C under the Example I conditions at 900–910° F. gave a 78.6% total conversion, of which 58.4% was acrylonitrile, 6.2% acetonitrile, 1.9% acrolein, 2.4% acetaldehyde and the remainder carbon dioxide and hydrogen cyanide.

*Example III*

A bismuth silicomolybdate catalyst was prepared following the procedure given in Example I, except that no phosphoric acid was added to the base catalyst slurry. This catalyst was then impregnated with barium acetate and fluosilicic acid solution, as described in Example I, and the resulting catalyst used in the oxidation of propylene as in Example I, in comparison with the base catalyst. The promoted catalyst gave an increase of approximately 10% in the conversion of propylene to acrylonitrile, as compared to the base catalyst.

All percentages in the specification and claims are by weight, in the case of the catalyst composition, and by volume in the case of gases.

We claim:

1. A process for the oxidation of open-chain monoolefins to the corresponding unsaturated mononitriles which comprises the step of contacting in the vapor phase at a temperature within the range from about 550 to about 1000° F. a mixture of ammonia, olefin and oxygen, said mixture having a molar ratio of olefin to ammonia of from about 1:0.05 to 1:5 and a molar ratio of olefin to oxygen of from about 1:0.5 to 1:3, the olefin having from about 3 to about 8 carbon atoms, in the presence of a catalyst consisting essentially of oxides of bismuth and oxides of molybdenum as the essential catalytic ingredients, the bismuth oxide being present in an amount to furnish a bismuth to molybdenum Bi:Mo atomic ratio of above 1:3, promoted by a mixture of oxides of barium and silicon in the proportion of about 1 to about 5% calculated as barium, and about 1 to about 10%, calculated as silicon.

2. The process of claim 1, which the mixture of ammonia, olefin and oxygen contains a molar ratio of olefin to ammonia of about 1:1.

3. The process of claim 1, in which the mixture of ammonia, olefin and oxygen contains a molar ratio of olefin to oxygen of from about 1:1 to 1:2.

4. The process of claim 1, in which the catalyst is bismuth molybdate.

5. The process of claim 1 in which the catalyst lso includes a phosphorus oxide containing only phophorus and oxygen in an amount up to about 5% by weight of the catalyst.

6. The process of claim 1 in which the catalyst is bismuth phosphomolybdate.

7. The process of claim 1, in which the catalyst corresponds to the empirical chemical formula:

72.5–97% $(Bi_aP_bMo_{12}O_c) \cdot$ 1–6% $BaO \cdot$ 2–21.5% $SiO_2$ where $a$ is a number within the range from about 4 to 36, $b$ is a number within the range from 0 to 2, and $c$ is $\frac{1}{2}n \cdot a + \frac{1}{2}m \cdot b + \frac{1}{2}p \cdot 12$, wherein $n$, $m$ and $p$ are the average valences of bisumth, phosphorus and molybdenum, respectively, in the catalyst.

References Cited by the Examiner

UNITED STATES PATENTS

| | | | |
|---|---|---|---|
| 2,523,686 | 9/1950 | Engel | 260—597 |
| 2,904,580 | 9/1959 | Idol | 260—465.3 |
| 2,941,007 | 6/1960 | Callahan et al. | 260—604 |
| 3,009,943 | 11/1961 | Hadley et al. | 260—465.3 |
| 3,102,147 | 8/1963 | Johnson | 260—465.3 |
| 3,153,085 | 10/1964 | Hadley | 260—465.3 |
| 3,153,665 | 10/1964 | Roelen et al. | 260—465.3 |
| 3,159,680 | 12/1964 | Kister | 260—604 |

CHARLES B. PARKER, *Primary Examiner.*